United States Patent
Jandeska, Jr. et al.

(10) Patent No.: US 7,141,207 B2
(45) Date of Patent: Nov. 28, 2006

(54) ALUMINUM/MAGNESIUM 3D-PRINTING RAPID PROTOTYPING

(75) Inventors: William F. Jandeska, Jr., Rochester, MI (US); James E. Hetzner, Saginaw, MI (US)

(73) Assignee: General Motors Corporation, Detroit, MI (US)

( * ) Notice: Subject to any disclaimer, the term of this patent is extended or adjusted under 35 U.S.C. 154(b) by 16 days.

(21) Appl. No.: 10/929,273

(22) Filed: Aug. 30, 2004

(65) Prior Publication Data

US 2006/0045787 A1  Mar. 2, 2006

(51) Int. Cl.
*B22F 1/02* (2006.01)
*B22F 7/02* (2006.01)

(52) U.S. Cl. ................ 419/7; 419/35; 419/36

(58) Field of Classification Search .......... 419/7, 419/5
See application file for complete search history.

(56) References Cited

U.S. PATENT DOCUMENTS

| | | | | |
|---|---|---|---|---|
| 3,781,170 A | * | 12/1973 | Nakao et al. ............... 75/232 |
| 4,501,611 A | * | 2/1985 | Begg .......................... 420/528 |
| 4,833,040 A | * | 5/1989 | Fishman et al. ........... 428/570 |
| 5,064,463 A | * | 11/1991 | Ciomek ....................... 75/314 |
| 5,076,869 A | | 12/1991 | Bourell et al. ............. 156/62.2 |
| 5,198,042 A | * | 3/1993 | Masumoto et al. ......... 148/403 |
| 5,204,055 A | | 4/1993 | Sachs et al. .................. 419/2 |
| 5,284,695 A | | 2/1994 | Barlow et al. ............... 264/497 |
| 5,374,295 A | * | 12/1994 | Miura et al. ................ 75/244 |
| 5,387,380 A | | 2/1995 | Cima et al. .................. 264/69 |
| 5,427,733 A | * | 6/1995 | Benda et al. .................. 419/1 |
| 5,745,834 A | * | 4/1998 | Bampton et al. ............. 419/37 |
| 5,749,041 A | * | 5/1998 | Lakshminarayan et al. .... 419/2 |
| 5,805,971 A | * | 9/1998 | Akedo ........................... 419/6 |
| 5,940,674 A | * | 8/1999 | Sachs et al. .................. 419/2 |
| 6,007,764 A | * | 12/1999 | Benda et al. .................. 419/7 |
| 6,036,777 A | | 3/2000 | Sachs .......................... 118/56 |
| 6,066,285 A | * | 5/2000 | Kumar ....................... 264/439 |
| 6,243,616 B1 | * | 6/2001 | Droscher et al. ........... 700/118 |
| 6,504,127 B1 | * | 1/2003 | McGregor et al. ..... 219/121.63 |
| 6,519,500 B1 | * | 2/2003 | White .......................... 700/119 |
| 6,676,892 B1 | * | 1/2004 | Das et al. ...................... 419/7 |
| 6,719,948 B1 | | 4/2004 | Lorenz et al. ............... 419/27 |
| 6,814,926 B1 | * | 11/2004 | Geving et al. ................. 419/5 |
| 2002/0016387 A1 | * | 2/2002 | Shen .......................... 523/201 |
| 2004/0055419 A1 | * | 3/2004 | Kurihara et al. ............. 75/362 |
| 2004/0140078 A1 | * | 7/2004 | Liu et al. ..................... 164/34 |

FOREIGN PATENT DOCUMENTS

| | | | | |
|---|---|---|---|---|
| CN | 1354055 A | * | 6/2002 |
| JP | 50096434 A | * | 7/1975 |
| JP | 83003024 B | * | 1/1983 |
| JP | 62093323 A | * | 10/1985 |
| JP | 62218529 A | * | 3/1986 |
| JP | 01017803 A | * | 1/1989 |

* cited by examiner

*Primary Examiner*—Daniel Jenkins
(74) *Attorney, Agent, or Firm*—Charles H. Ellerbrock

(57) ABSTRACT

A 3D Printing Rapid Prototyping process using Al/Mg particles coated with a metal (i.e. copper, nickel, zinc, or tin) that (1) prevents oxidation of the Al/Mg particles, and (2) either alone, or when alloyed with the aluminum or magnesium core metal, melts below the liquidus temperature of the core.

6 Claims, No Drawings

ALUMINUM/MAGNESIUM 3D-PRINTING RAPID PROTOTYPING

GOVERNMENT FUNDING

This invention was made in the course of work performed under NIST contract 3DP/ATP #70NANB7H3030 which grants the U.S. government rights under this invention.

TECHNICAL FIELD

This invention relates to rapid prototyping processes, and more particularly to the "3D-Printing" variant thereof as applied to making aluminum or magnesium articles.

BACKGROUND OF THE INVENTION

Rapid prototyping processes are well known, and employ known layered manufacturing techniques wherein an article (e.g. metal casting mold, prototype part, etc.) is progressively made in a series of layers sequentially built-up one upon the next. One variant of such process is the so-called SLA 1 System wherein a computer-controlled, focused UV laser is scanned over the top surface of a bath of a photopolymerizable liquid polymer to selectively polymerize the polymer where the laser beam strikes it, and thereby form a first solid polymeric layer at the top surface of the bath. This solid layer is then lowered into the bath such that a fresh layer of liquid polymer covers the solid layer. The laser polymerization process is then repeated to generate a second solid polymeric layer, and so on, until a plurality of superimposed solid polymeric layers complete the desired article. Another variant of the rapid prototyping process is known as the Selective Laser Sintering (SLS) process, wherein a computer-controlled laser beam sinters selected areas of multiple layers of loosely compacted powder (e.g. plastic, metal, ceramic, wax etc.), layer-by-layer, until the article is completely built-up. The SLS variant is described in more detail in U.S. patent Bourell et al. U.S. Pat. No. 5,076,869 issued Dec. 31, 1991. Still another variant is known as the "3D-Printing" rapid prototyping process wherein a computer-controlled ink jet printing device (e.g. continuous stream, or drop-on-demand type) propels a stream of binder from one or more jets onto select areas of a first layer of loose particles (i.e. about 60 µm to about 140 mµ in diameter) according to a pattern dictated by the computer. A microcomputer, such as is used in computer assisted design (CAD) work, controls the jets according to a three dimensional (3D) computer model of the article, and two dimensional (2D) slices taken therethrough, as is well known to those skilled in the art. Thereafter, a second layer of loose particles is laid atop the first layer, and as with the first layer, the ink jet selectively directs a stream of binder onto the second layer of particles. The particle layers may be formed by depositing either dry particles, or particles suspended in a volatile liquid, onto a working surface before the binder is applied. When used, the volatile liquid is allowed to evaporate, at least partially, from a first layer before depositing a second layer thereon. This process is repeated, over and over, layer after layer, until the article is completed. The binder in one layer is at least partially hardened (e.g. dried or cured) before the next layer of particles is laid down. The finished article may thereafter be heated for further drying/curing of the binder to provide the article with sufficient green strength for handling, and to permit separating of the loose, unbonded particles from the bonded particles without distorting or damaging the article. Thereafter, the article may further be heated to sinter or weld the particles together to form a finished, albeit porous, article. Depending on the intended use of the article, it may or may not thereafter be infiltrated with a suitable infiltrant (e.g. a polymer, or a metal having a liquidus temperature lower than that of the sintered metal particles) to seal the article and eliminate the porosity. The 3D-Printing rapid prototyping process is described in more detail in U.S. patents Sachs et al U.S. Pat. No. 5,204,055 (issued Apr. 20, 1993), Cima et al. U.S. Pat. No. 5,387,380 (issued Feb. 7, 1995), and Sachs U.S. Pat. No. 6,036,777 (issued Mar. 14, 2000) which are herein incorporated by reference.

It would be desirable to manufacture light-weight articles from particles made from aluminum or magnesium or their alloys (hereafter Al/Mg particles) using the 3D-Printing rapid prototyping technique. However, it has not heretofore been possible to do so owing to the reactivity of Al/Mg particles and their propensity to readily oxidize in air to form an oxide skin on the particle's surface that impedes sintering/welding of the particles to each other.

SUMMARY OF THE INVENTION

The present invention contemplates making an aluminum or magnesium article by the 3D Printing rapid prototyping process wherein (1) a first layer of coated Al/Mg particles (with or without a particulate sintering-aid) is spread onto a supporting surface, (2) a computer-controlled jet of liquid binder is directed onto selective areas of the particle layer and hardened to bond the particles together in a pattern dictated by the computer, (3) another layer of coated Al/Mg particles is spread atop the first layer, (4) steps 2 and 3 above are repeated multiple times until the article is formed and resides in a matrix of unbonded coated particles, (5) the unbonded particles are separated from the binder-bonded particles, and (6) the binder-bonded particles are sintered/welded together.

In accordance with the present invention, the coated particles comprise a core metal selected from the group consisting of aluminum, magnesium and their alloys, and a coating on the core that protects the core from oxidation. The coating preferably comprises a metal whose oxide is reducible by heating in a non-oxidizing atmosphere to a temperature below the liquidus temperature of the core, and either (1) itself melts below the liquidus temperature of the core metal, or (2) alloys with the core metal to form a surface layer on the core that melts below the liquidus temperature of the core metal. The coating metal is preferably selected from the group consisting of copper, nickel, zinc, and tin, with copper being the most preferred. In one embodiment, only one layer of metal is used. In another embodiment, several layers are used. For example, a copper topcoat is underlaid with a first undercoating (e.g. Zn or Si) that forms an alloy with the copper and the core metal, which alloy melts below the liquidus temperature of the Al/Mg core metal. For aluminum particles, the undercoat preferably comprises Zn, Si, or Mg. Alternatively, copper could be the first (i.e. under) coating and the zinc, tin or nickel the topcoat. Moreover, the metal-coated Al/Mg particles may be mixed with about 2% to about 40%, by weight, of particles of a sintering aid which supplies sufficient quantity of an alloyant to the copper-coated Al/Mg particles to promote transient liquid phase sintering, i.e. sintering wherein a liquid phase is temporarily formed on the surfaces of the particles during heating. One preferred such sintering aid comprises, by weight, about 92% to about 98% aluminum, about 2% to about 4% magnesium, and 0% to about 4% of silicon. Another preferred sintering aid comprises 50% Mg and 50% Al. The copper reacts with the sintering aid to form low-melting point liquid phase that, upon solidification, serves to weld/cement the particles together at their points of contact.

DETAILED DESCRIPTION OF A SPECIFIC EXAMPLE

Near oxide-free 6061 aluminum alloy (i.e. 0.4–0.8% Si, ≦0.7% Fe, balance Al) particles, having particle sizes ranging between about 60 micrometers and 140 micrometers (mean particle size about 80 micrometers), are prepared using any of the well known atomization techniques for making metal particles, which techniques are not themselves part of the present invention. Hence, for example, the 6061 Al particles may be made by such well known techniques as the "water atomization" process, the "gas atomization" process, the "centrifugal atomization" process, the "vacuum atomization" process, or the "ultrasonic atomization" process, all of which are described in the technical and patent literature including the Metals Handbook, Vol 7 (Powder Metallurgy), Ninth Edition, pages 25–29, which is incorporated herein by reference. Preferably, the particles will be made by the "gas-atomization" process, and most preferably by the so-called "Alcoa Process" variant thereof wherein a jet of high pressure gas impinges on a stream of molten metal so as to propel the articles upwardly into an upwardly circulating stream of cooling gas. The Alcoa Process is described in more detail in technical and patent literature including the Metals Handbook, supra, at pages 127–131, which is intended to be incorporated herein by reference. Inert gas atomization processes are preferred because they yield particles which are more spherical in shape, and have a lower oxide content than, for example, water-atomized particles.

The 6061 Al alloy particles are next coated with a thin layer of copper (i.e. about 0.1% to about 6% by weight of the particle) using any of the well known techniques for metal coating metal particles, which techniques are not themselves part of the present invention. Alternative coating metals include nickel, zinc, and tin. Before metal coating begins, any Al oxide that may have formed on the surfaces of the Al particles may be removed, or not. Preferably, the particles are deoxidized and Cu coated using the so-called "Recirculating, Fast Fluidized Bed Chemical Vapor Deposition" (RFFBCVD) process and equipment, which is described in the technical and patent literature including Sherman et al U.S. Pat. No. 5,876,793, which is hereby incorporated herein by reference The RFFBCVD process is practiced commercially by Powdermet Inc. of Sun Valley California. In that process, the particles are fluidized and circulated through a heated reaction zone in a suitable reactor. A reducing gas (e.g. $H_2$) may be initially supplied to the fluidized bed in the reactor to deoxidize any oxides that might be on the surfaces of the Al particles. After most of the oxide has been removed, the flow of reducing gas to the reactor is terminated, and a gaseous organometallic coating-precurser (e.g. copper acetylacetonate) substituted therefor. The organometallic gas stream will preferably be diluted with an inert gas (e.g. nitrogen). The gaseous coating-precurser is flowed upwardly through the bed at a velocity that operates the bed in the turbulent fluidization flow regime. The particles are recirculated through the reactor as many times as is needed to build up a sufficient thickness of metal on the particles. The gaseous organometalic compound decomposes when it contacts a heated particle resulting in deposition of the metal component (e.g. Cu) thereof onto the particles. High gas/solid shear velocities promote the formation of coatings that filly encapsulate the particles.

A thin (i.e. about 1 mm to about 5 mm) layer of the thusly prepared copper-coated Al particles, and 4% of a sintering aid comprising 50% Mg, is spread onto the working surface of a 3D Printing Rapid Prototype machine a manner well known to those skilled in the art (e.g. se Sachs U.S. Pat. No. 6,036,777, supra). One such machine is the RTS 3000 machine available from the Prometal Division of the Extrude Hone Corporation. The layer is then scanned with a computer-controlled ink-jet head, ala Sachs, having a plurality of binder dispensers that direct(s) one or more streams of liquid binder onto the layer of particles according to a pattern dictated by the computer. Suitable binders/inks are organic (e.g. polymeric resins) or inorganic (e.g. silicates) materials that are soluble either in water or volatile organic solvents (e.g. butyral resin). Alternatively, the binder particles may be deposited as solid particles from a suspension thereof in a suitable vehicle. Liu et al. U.S. Pat. No. 6,585,930 describes a carbohydrate-based binder, containing certain sugars and starches, for use in the 3D-Printing rapid prototyping process. This layer-forming process is repeated over and over, in known fashion so as to build up the desired article (e.g. prototype part) layer-by-layer. Though the binder hardens somewhat as each of the layers is laid down, once the article has been completely built up (i.e. the layering process complete), the layered article is heated to further dry/cure the binder and to provide sufficient green strength for subsequent handling of the article. Thereafter, excess unbonded particles are removed by shaking, vibrating, brushing and/or air-blasting. Finally, the article is heated to about 610° C. for about 15 minutes in an inert atmosphere, at which time the Cu, sintering aid and Al react to initially form a liquid phase, and thereafter further react and solidify to bond the article together.

According to another embodiment of the invention, the coating may comprise two or more layers of different materials that react with each other and the core metal to form low melting phases that are compatible with the Al/Mg core metal. Hence for example, multi-layer coatings such as Mg overlaid with Cu, or Zn overlaid with Cu, or Silicon overlaid with Cu will alloy with each other and the core metal during heating to form a liquid phase that melts below the core metal and promote transient liquid phase sintering, or particle-to-particle welding by the temporary melting and subsequent resolidification of metal on the surface of the particles. By controlling the composition and thickness of the metal coatings, the chemistry of the reaction can be tightly controlled, including the amount of time that the liquid phase is present. Most preferably, the coatings are selected such that the alloy formed not only promotes bonding between the particles, but also strengthens the core metal and minimizes geometric distortion of the article upon solidification. A preferred combination of metal coatings for this purpose comprises a 0.1% to 0.2% Zn or Mg under-layer, and a 0.1% to 4% Cu top-layer on an aluminum core. When multiple layers are used, sintering may be effected at lower temperatures than with a single layer. Hence, for example, with a zinc-copper dual-layer system, sintering may be effected at about 585° C. in about 15 min.

According to another embodiment of the invention, the Al/Mg particles are coated with a single layer of metal and then mixed with about 2% to about 40%, by weight, of particles of a sintering aid which promotes transient liquid phase sintering. The sintering aid is essentially a so-called "master alloy" which contains high concentrations of alloyants which, when alloyed with the core and the metal coating on the Al/Mg particles, temporarily forms a low melting phase which upon solidification welds/cements the particles together. When a sintering aid master alloy is used, sintering may be effected at lower temperatures than when only a single metal coating is used. Hence, for example, with copper-coated Al particles sintering may be effected at about 595° C. in about 15 mim. if used with about 4% of a sintering aid comprising 50% Mg and 50% Al.

While the invention has been described in terms of certain specific embodiments thereof, it is not intended to be limited thereto but rather only to the extent set forth hereafter in the claims which follow.

The invention claimed is:

1. In the 3D-Printing rapid prototyping process for making articles in a series of layers formed one atop the next comprising the principal steps of (1) spreading a first layer of metal particles onto a surface, (2) directing a computer-controlled jet of binder onto selective areas of said layer in a pattern dictated by said computer, (3) spreading another layer of said metal particles atop said first layer, (4) repeating steps 2 and 3 multiple times until said article is formed and resides in a matrix of unbonded said particles, (5) hardening said binder to bond said particles together, (6) separating unbonded particles from binder-bonded particles, and (7) welding the binder-bonded particles together metal-to-metal, the improvement wherein said particles comprise a metal core selected from the group consisting of aluminum, magnesium, and their alloys, and a multi-layer coating atop said core protecting said core from oxidation before said welding, and promoting metal liquid phase sintering of said particles during said welding, said multi-layer coating comprising a topcoat comprising a metal whose oxide is reducible by heating in a non-oxidizing atmosphere to a temperature below the liquidus temperature of said core, and an undercoat comprising a material that is different than said metal topcoat and, upon sufficient heating, alloys with both said core and said topcoat to form an alloy on the surface of said core that melts below said liquidus temperature.

2. A process according to claim 1 wherein said particles are mixed with about 2% to about 40% by weight of a sintering aid that, during said heating, promotes transient liquid phase sintering of said particles.

3. A process according to claim 2 wherein said sintering aid comprises an AlMg alloy comprising about 50% Al and about 50% Mg.

4. A process according to claim 1 wherein said undercoat comprises a material selected from the group consisting of copper, nickel, zinc, silicon and tin.

5. In the 3D-Printing rapid prototyping process for making articles in a series of layers formed one atop the next comprising the principal steps of (1) spreading a first layer of metal particles onto a surface, (2) directing a computer-controlled jet of binder onto selective areas of said layer in a pattern dictated by said computer, (3) spreading another layer of said metal particles atop said first layer, (4) repeating steps 2 and 3 multiple times until said article is formed and resides in a matrix of unbonded said particles, (5) hardening said binder to bond said particles together, (6) separating unbonded particles from binder-bonded particles, and (7) welding the binder-bonded particles together metal-to-metal, the improvement wherein said particles comprise a metal core selected from the group consisting of aluminum, magnesium, and their alloys, and a multi-layer coating atop said core protecting said core from oxidation before said welding, and promoting metal liquid phase sintering of said particles during said welding, said multi-layer coating comprising a topcoat selected from group consisting of copper, nickel, zinc and tin, and an undercoat comprising a material that is different than said metal topcoat and, upon sufficient heating, alloys with both said core and said topcoat to form an alloy on the surface of said core that melts below said liquidus temperature.

6. In the 3D-Printing rapid prototyping process for making articles in a series of layers formed one atop the next comprising the principal steps of (1) spreading a first layer of metal particles onto a surface, (2) directing a computer-controlled jet of binder onto selective areas of said layer in a pattern dictated by said computer, (3) spreading another layer of said metal particles atop said first layer, (4) repeating steps 2 and 3 multiple times until said article is formed and resides in a matrix of unbonded said particles, (5) hardening said binder to bond said particles together, (6) separating unbonded particles from binder-bonded particles, and (7) welding the binder-bonded particles together metal-to-metal, the improvement wherein said particles comprise an aluminum core, and a multi-layer coating atop said core protecting said core from oxidation before said welding, and promoting metal liquid phase sintering of said particles during said welding, said multi-layer coating comprising a copper topcoat and an undercoat selected from the group consisting of zinc, magnesium and silicon.

* * * * *